(12) United States Patent
Côté

(10) Patent No.: US 8,230,809 B2
(45) Date of Patent: Jul. 31, 2012

(54) ADJUSTABLE SQUIRREL PROOF BIRD FEEDER

(76) Inventor: Paul Côté, Lac Brome (CA)

(*) Notice: Subject to any disclaimer, the term of this patent is extended or adjusted under 35 U.S.C. 154(b) by 427 days.

(21) Appl. No.: 12/587,657

(22) Filed: Oct. 9, 2009

(65) Prior Publication Data

US 2011/0083610 A1    Apr. 14, 2011

(51) Int. Cl.
*A01K 39/00* (2006.01)
(52) U.S. Cl. ..................... 119/52.3; 119/57.9
(58) Field of Classification Search ............. 119/51.01, 119/52.3, 57.9, 57.38, 52.2, 52.4
See application file for complete search history.

(56) References Cited

U.S. PATENT DOCUMENTS

| | | | |
|---|---|---|---|
| 6,119,627 A * | 9/2000 | Banyas et al. ............... | 119/57.9 |
| 6,253,707 B1 * | 7/2001 | Cote ............................ | 119/57.9 |
| 6,543,384 B2 * | 4/2003 | Cote ............................ | 119/57.9 |
| 6,591,781 B2 * | 7/2003 | Hardison ..................... | 119/57.9 |
| 6,945,192 B2 * | 9/2005 | Cote ............................ | 119/57.9 |
| 7,191,731 B2 * | 3/2007 | Cote ............................ | 119/57.9 |
| 7,219,621 B2 * | 5/2007 | Coroneos .................... | 119/57.1 |
| 7,540,260 B2 * | 6/2009 | Rich et al. ................... | 119/57.9 |
| 7,739,982 B2 * | 6/2010 | Cote ............................ | 119/57.9 |
| 2003/0226514 A1 * | 12/2003 | Cote ............................ | 119/57.9 |
| 2008/0105206 A1 * | 5/2008 | Rich et al. ................... | 119/57.9 |
| 2008/0295777 A1 * | 12/2008 | Cote ............................ | 119/52.3 |

\* cited by examiner

*Primary Examiner* — Kimberly Berona
(74) *Attorney, Agent, or Firm* — Eric Finchman

(57) ABSTRACT

A bird feeder comprising a seed container, a seed tray situated below the seed container, a shroud extending about the seed tray and having an opening therein to permit access thereto, a perch proximate the opening, a center tube mounted internally of the feed container and a non rotatable nut mounted within the center tube, a post being screwthreadedly engaged with the non rotatable nut to adjust spring tension, a cover about an upper end of the feed container, the arrangement being such that pressure from an animal such as a squirrel on either the cover or perch will cause the shroud to block the opening and deny access to the seed.

15 Claims, 17 Drawing Sheets

ADJUSTABLE SQUIRREL PROOF BIRD FEEDER

FIELD OF THE INVENTION

The present invention relates to bird feeders and more particularly, relates to bird feeders having means to deter the presence of undesired marauders.

BACKGROUND OF THE INVENTION

Selective bird feeders are known in the art and are designed to limit the maximum size of a bird or animal which can access the seed in the feeder. The reasons for excluding certain birds may be many. Thus, as disclosed in U.S. Pat. No. 3,241,525, there is provided a selective bird feeder which is specific to cardinals. As taught by this patent, a favorite seed of cardinals is the sunflower seed; this seed is also popular with both smaller and larger birds.

Some larger birds will also attempt to access the seed and some such birds including crows, grackles, bluejays and the like are considered by some people to be undesirable.

A further problem associated with bird feeders are marauders which gain access to the seeds. In particular, squirrels are well known for their ability to reach the seed in a bird feeder and to devour the same. Many approaches have been tried to discourage or prevent squirrels from reaching the bird feeder, including various types of covers and baffles on poles. These seldom work as the squirrels have shown great ingenuity in overcoming such devices.

The prior art also teaches other solutions to the problem utilizing shrouds. These may be exemplified by U.S. Pat. No. 4,646,686 to Furlani which teaches a moveable shroud. Other shroud-type squirrel resistant bird feeders are those such as shown in U.S. Pat. Nos. 6,253,707 and 6,543,384.

SUMMARY OF THE INVENTION

It is an object of the present invention to provide an adjustably selective bird feeder having a movable shroud to protect and isolate the access openings by which the birds can gain access to the feed in the container while preventing unwanted intruders from accessing the feed.

It is a further object of the present invention to provide a squirrel resistant bird feeder wherein weight over a predetermined amount on either the cover or the perch will cause the shroud to move to a position denying access to the seed in the seed container.

According to one aspect of the present invention there is provided a bird feeder comprising a seed container, a seed tray situated below the seed container and connected thereto, a shroud extending about the seed tray, the shroud having an opening therein to permit access to the seed tray, the shroud having a bottom portion, a perch proximate the opening in the shroud, a center tube mounted internally of the seed container, a non rotatable nut mounted within the center tube proximate an upper end thereof, a rotatable post within the center tube, an upper end of the rotatable post being screwthreadedly engaged with the non rotatable nut, a lower end of the rotatable post extending through the bottom portion of the shroud, stop means on the rotatable post to retain the shroud, a spring within the center tube, the spring extending between the non rotatable nut and the seed tray, a plunger having a portion thereof located within an upper end of the center tube, the plunger contacting an upper end of the post, a rod extending upwardly from a top end of the center tube and a cover about an upper end of the feed container, the cover resting on the plunger.

The bird feeder of the present invention may be formed of any suitable and conventional material and combinations thereof. Thus, many different plastics and metallic materials may be utilized depending upon the desired costs and appearance of the bird feeder.

The seed container of the instant bird feeder will have an open top to permit the dispensing of seed thereinto and an open bottom to permit egress of the seed. Preferably, the internal diameter of the seed container at its lower portion is somewhat smaller than the internal diameter of the main body in order to provide a limited and controlled egress of the seeds. The seed container is utilized in conjunction with a seed tray situated below the lower end of the seed container and slightly spaced therefrom such that seed may flow from the seed container to the seed tray.

The seed tray will have a bottom wall and a side wall to retain the seed therein. Preferably, the seed tray has a plurality of apertures therein to permit drainage. Even further, it is preferred that the upper surface of the seed tray have a slightly convex configuration to direct seed from the seed container outwardly to the side wall. The seed tray is preferably connected to the seed container in a spaced relationship thereto.

The seed container also preferably has one or more ribs on an upper outer wall to create a bearing surface with the cover and to create a space to allow the passage of air to and from the seed tube.

The shroud extends about the seed tray and has an opening therein to permit access to the seed tray. When desired, as will be discussed in greater detail hereinbelow, the shroud can move downwardly to block access to the seed tray.

In one preferred embodiment, the shroud is formed of two portions, an upper portion and a lower portion. The two portions are connected by connecting members and the connecting members may extend downwardly past the shroud and then outwardly to form legs to support the bird feeder when on a horizontal surface. The connecting members also serve as bearing surfaces to locate the seed tray in a desired position.

In one preferred embodiment, the perch is a continuous ring which extends 360° around the seed tray.

The seed container includes a hollow center tube which extends from the bottom thereof to up above the top of the seed container. It can be molded as an integral part of the seed container and preferably is connected to the side walls of the seed container by a plurality of ribs.

The hollow tube contains the springs and other components which permits the movement of the shroud. To this end, the center tube preferably has a pair of ribs extending inwardly to retain components in place as will be discussed in greater detail hereinbelow. Also, the center tube preferably has a greater internal diameter at the lower end thereof compared to the internal diameter proximate the upper end thereof.

The bird feeder includes a post which fits within the center tube and has a threaded upper portion which is designed to screw threadably engage a nut. The nut preferably has slots in the sidewalls thereof which engage the inwardly extending ribs whereby the nut is held in a nonrotatable manner. Other means such as shaped nuts and corresponding nut holders may be utilized—i.e. a hex nut in a hexagonal receptacle.

Extending about the post is at least one spring member. In a preferred embodiment, a pair of spring members in an abutting relationship may be utilized with each of the springs having a different spring force. This can permit a more precise calibration of the device.

A plunger is preferably formed of two different components. There is provided an inner plunger which fits within the center post and an outer plunger which has portions thereof external to the center tube. The two plunger portions are connected together by suitable means such as screws or the like.

The arrangement is one wherein the inner plunger provides a bearing surface for the upper end of the post. The outer portion of the plunger is designed to extend about the upper portion of the center tube to prevent seed from gaining access thereto.

For purposes of hanging the bird feeder, preferably there is provided a rod extending upwardly from the top end of the center tube. The rod may be secured to the top of the center tube by any conventional means including a mechanical arrangement and the use of adhesives. The rod has, at its upper end, an aperture therein to receive a hanger.

The bird feeder includes a cover which extends about the top of the seed container. The cover preferably includes an inner vertical wall which contains a plurality of vents therein. The cover is placed such that it rests on top of the plunger and in this position, the top of the seed container is spaced from the cover to permit egress of air through the vents in the inner vertical wall. The seed container, as previously mentioned, also has a plurality of ribs to ensure spacing from the inner vertical wall and thus ensure a passageway for air.

BRIEF DESCRIPTION OF THE DRAWINGS

Having thus generally described the invention, references will be made to the accompanying drawings illustrating an embodiment thereof, in which.

DETAILED DESCRIPTION OF THE INVENTION

Figure 1A:
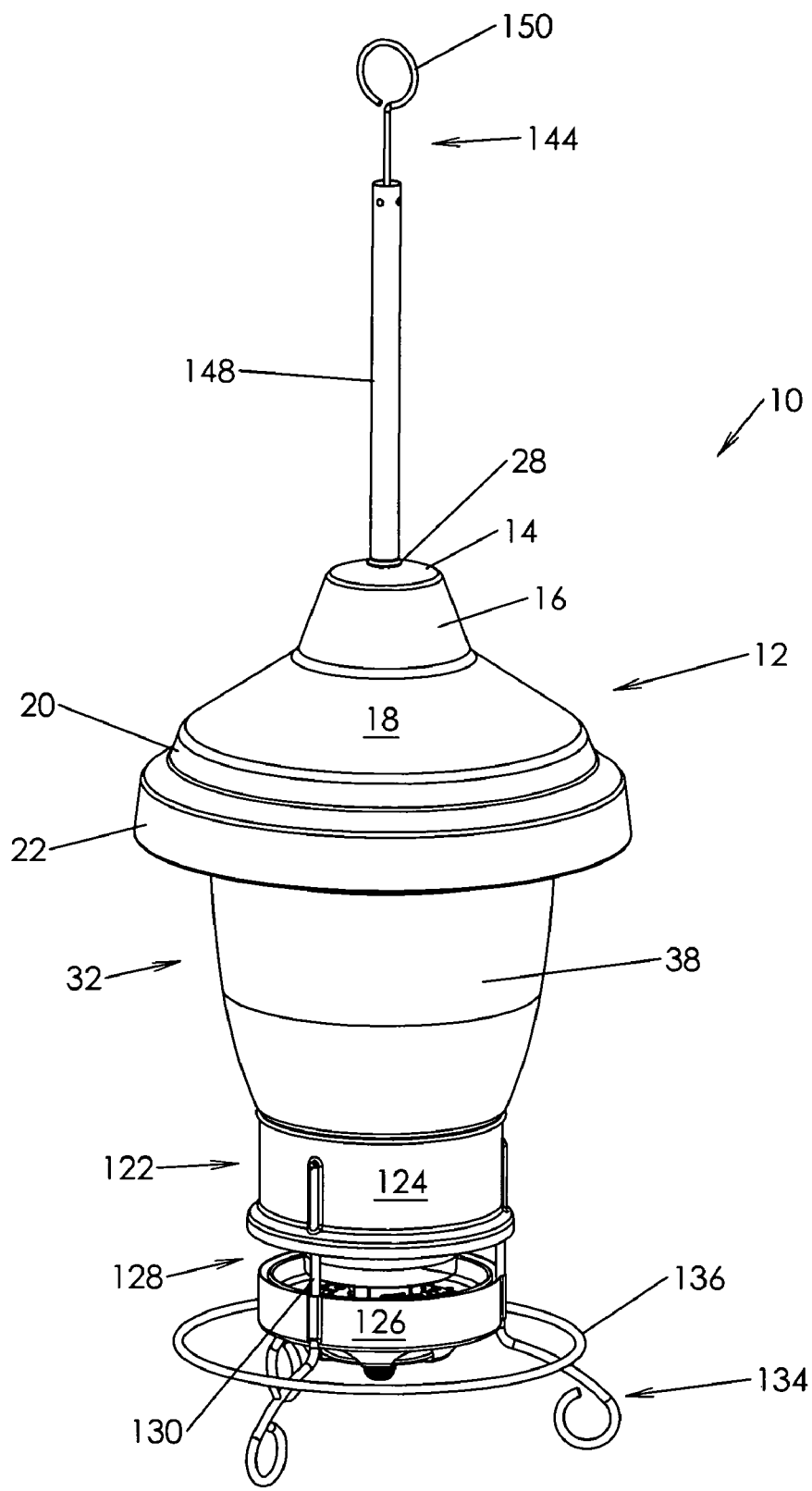
FIG. 1A is a perspective view of a bird feeder according to the present invention.
Figure 1B:
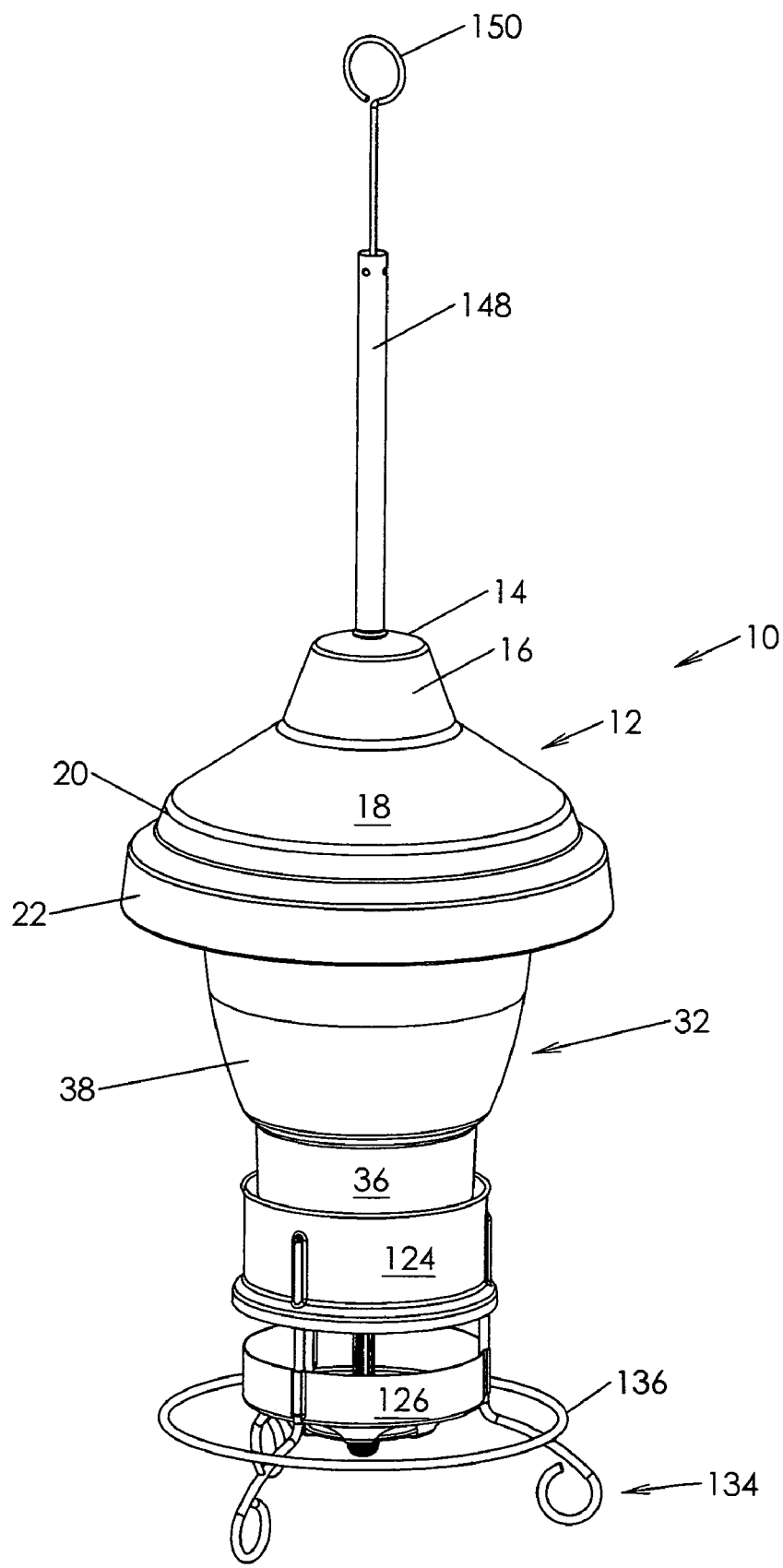
FIG. 1B is a perspective view of the bird feeder of FIG. 1A when the shroud blocks access to the seed tray.
Figure 2:
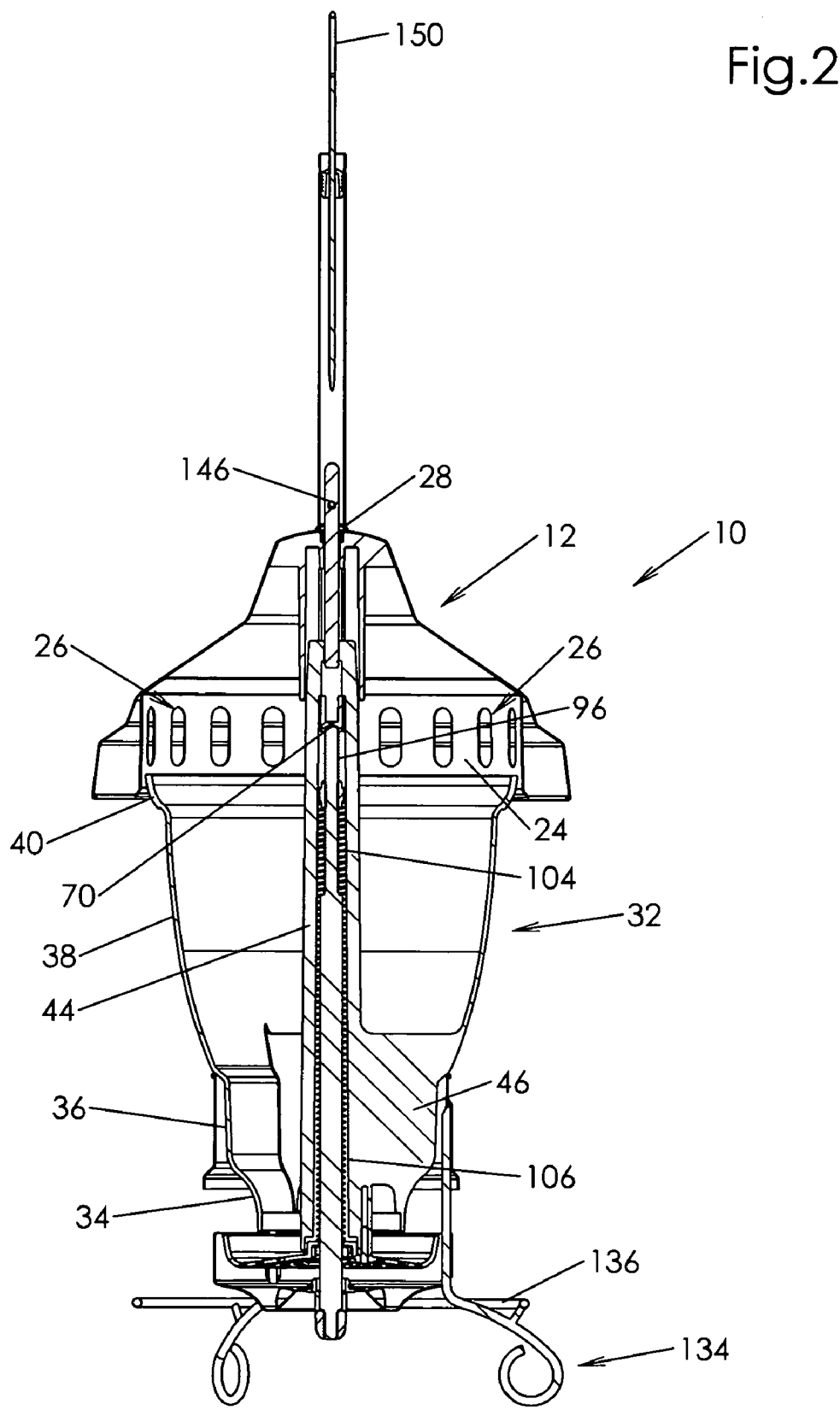
FIG. 2 is a side sectional view thereof.
Figure 3:
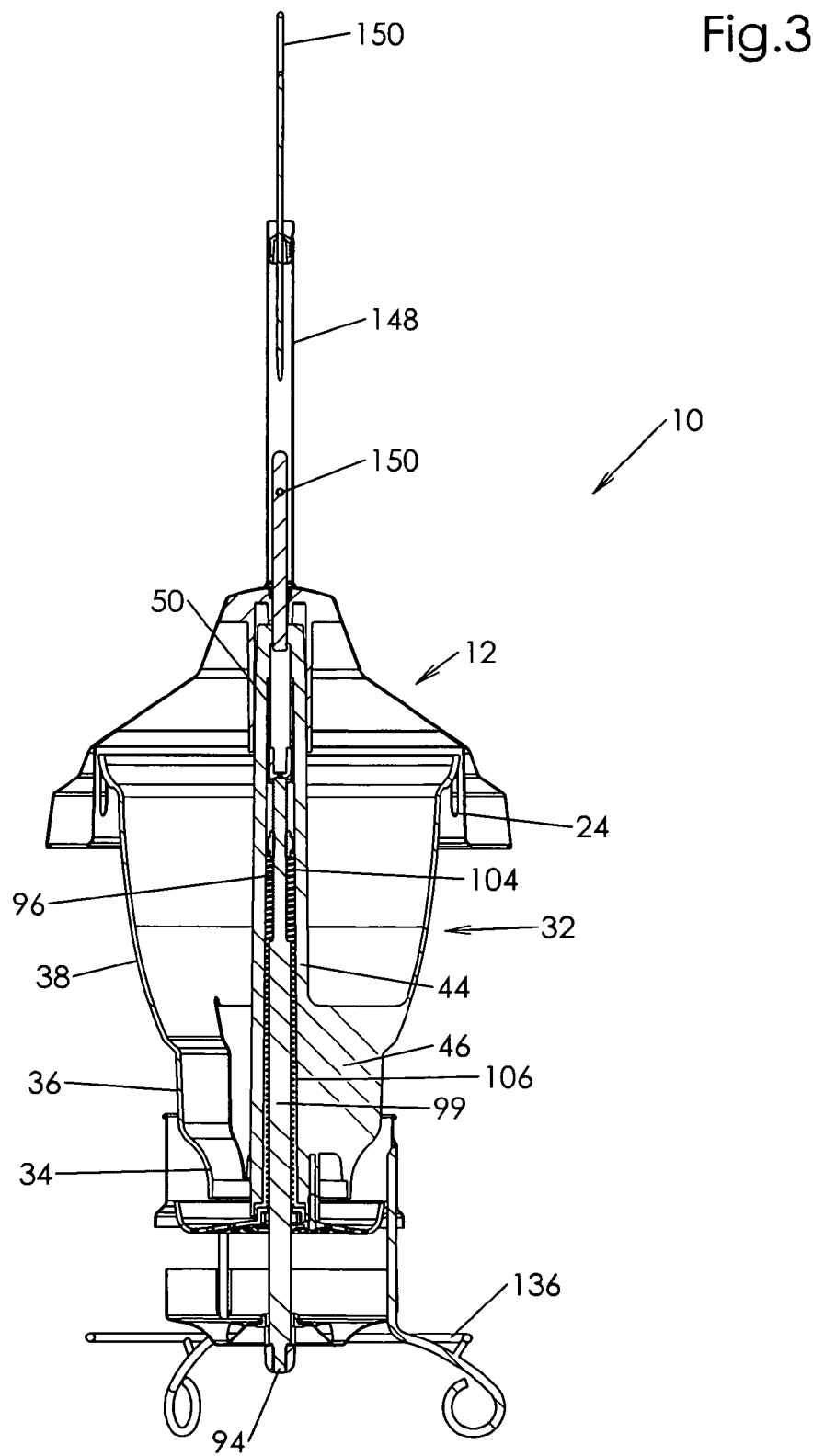
FIG. 3 is a side sectional view similar to FIG. 2 wherein the shroud has been lowered to prevent access to the seed tray.
Figure 4:
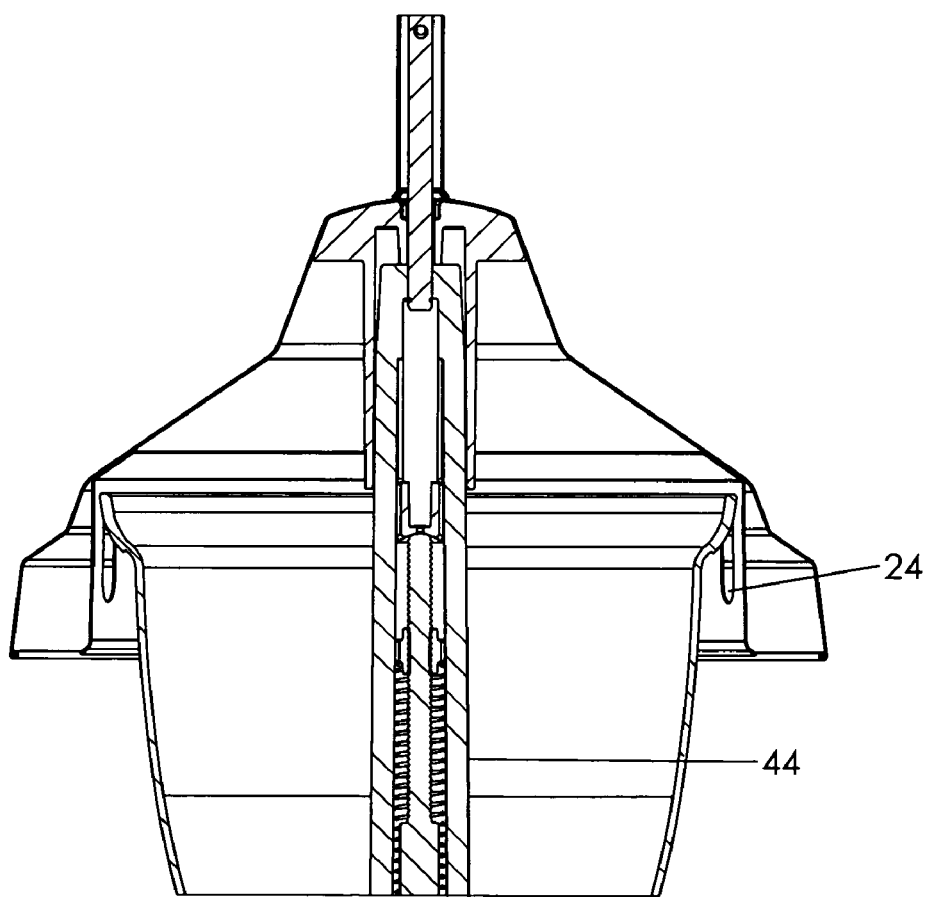
FIG. 4 is a cross sectional view of the upper portion of the bird feeder.
Figure 5:
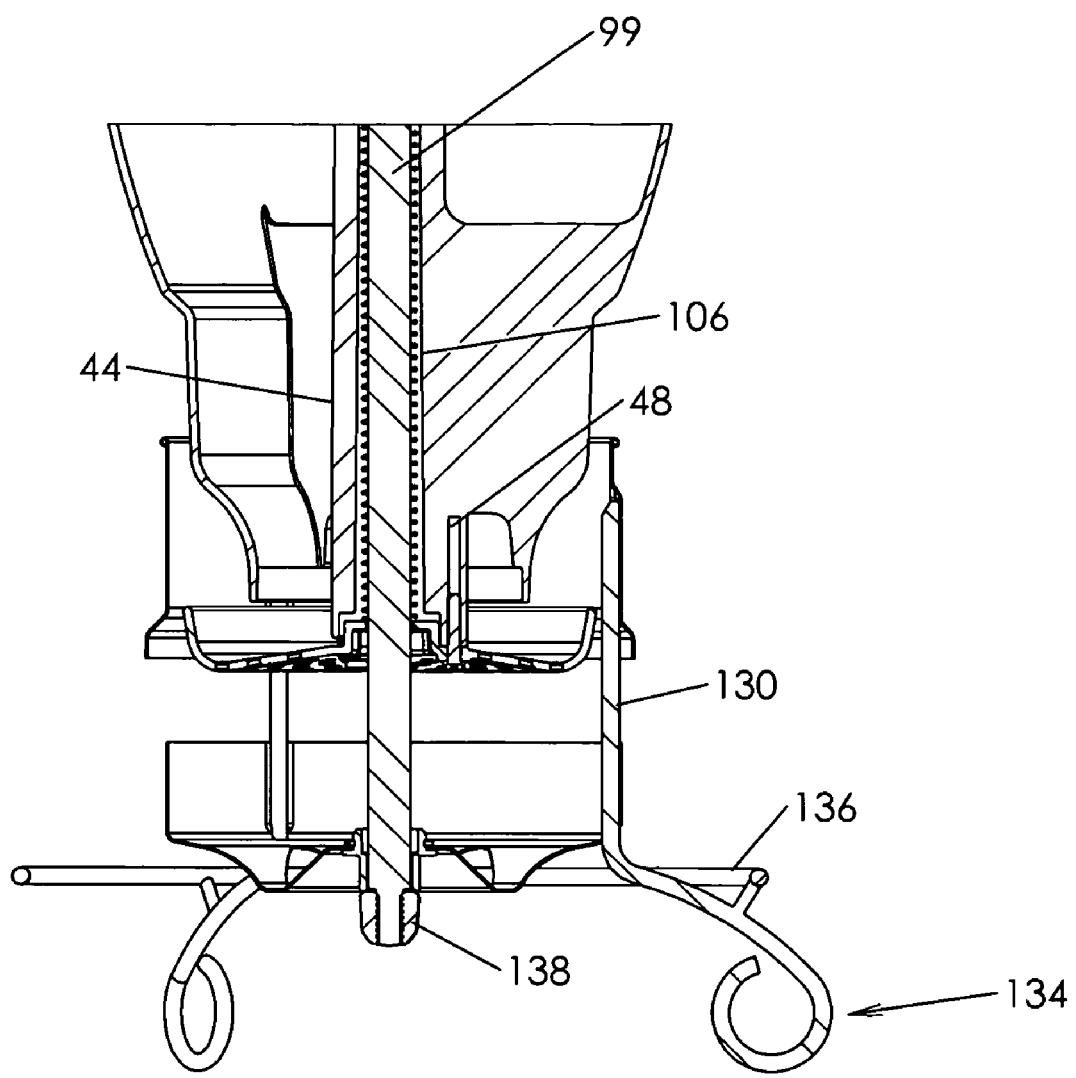
FIG. 5 is a cross sectional view of the lower portion of the bird feeder wherein access to the seed tray is denied.
Figure 6:
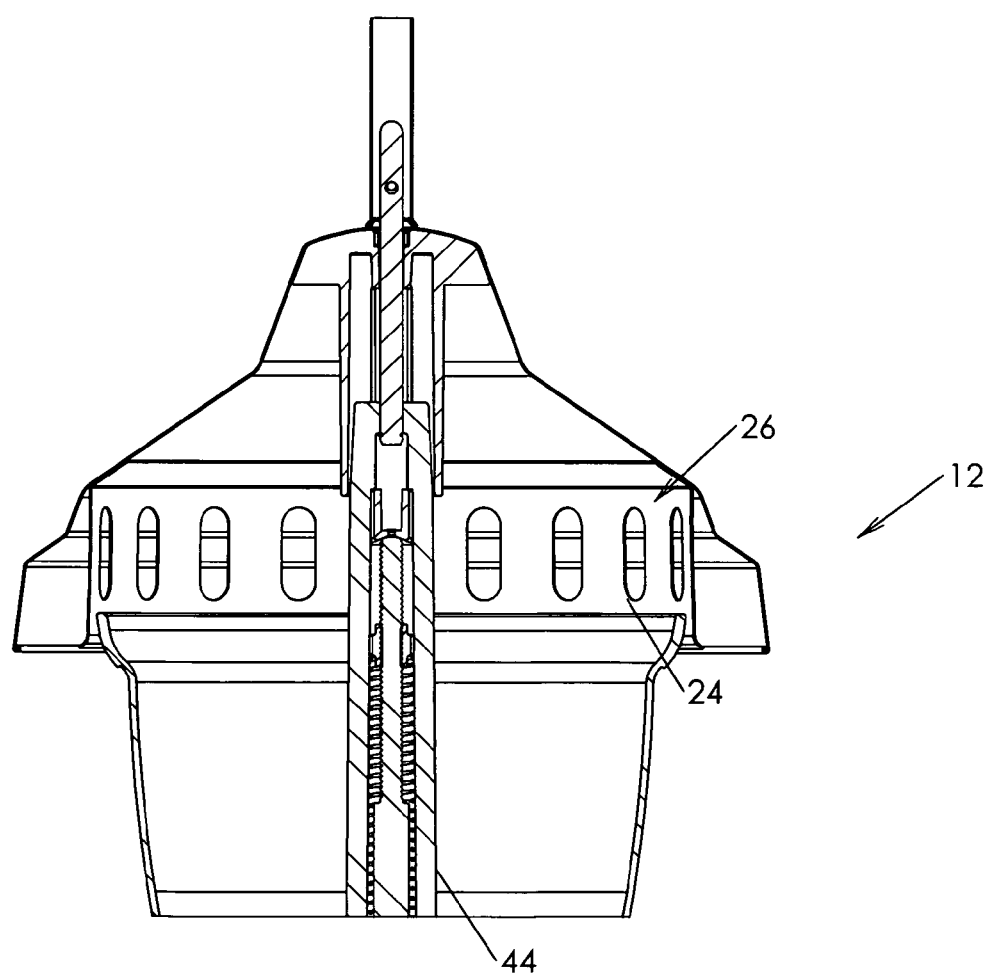
FIG. 6 is a cross sectional view of the cover and associated portions.
Figure 7:
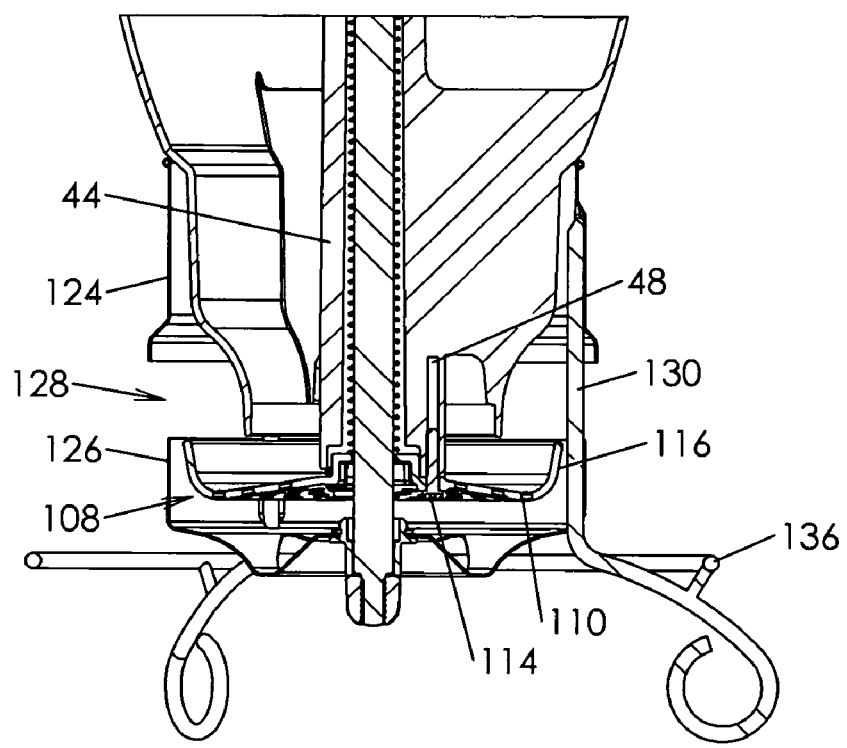
FIG. 7 is a side sectional view of the shroud, a portion being a cut away view.
Figure 8:
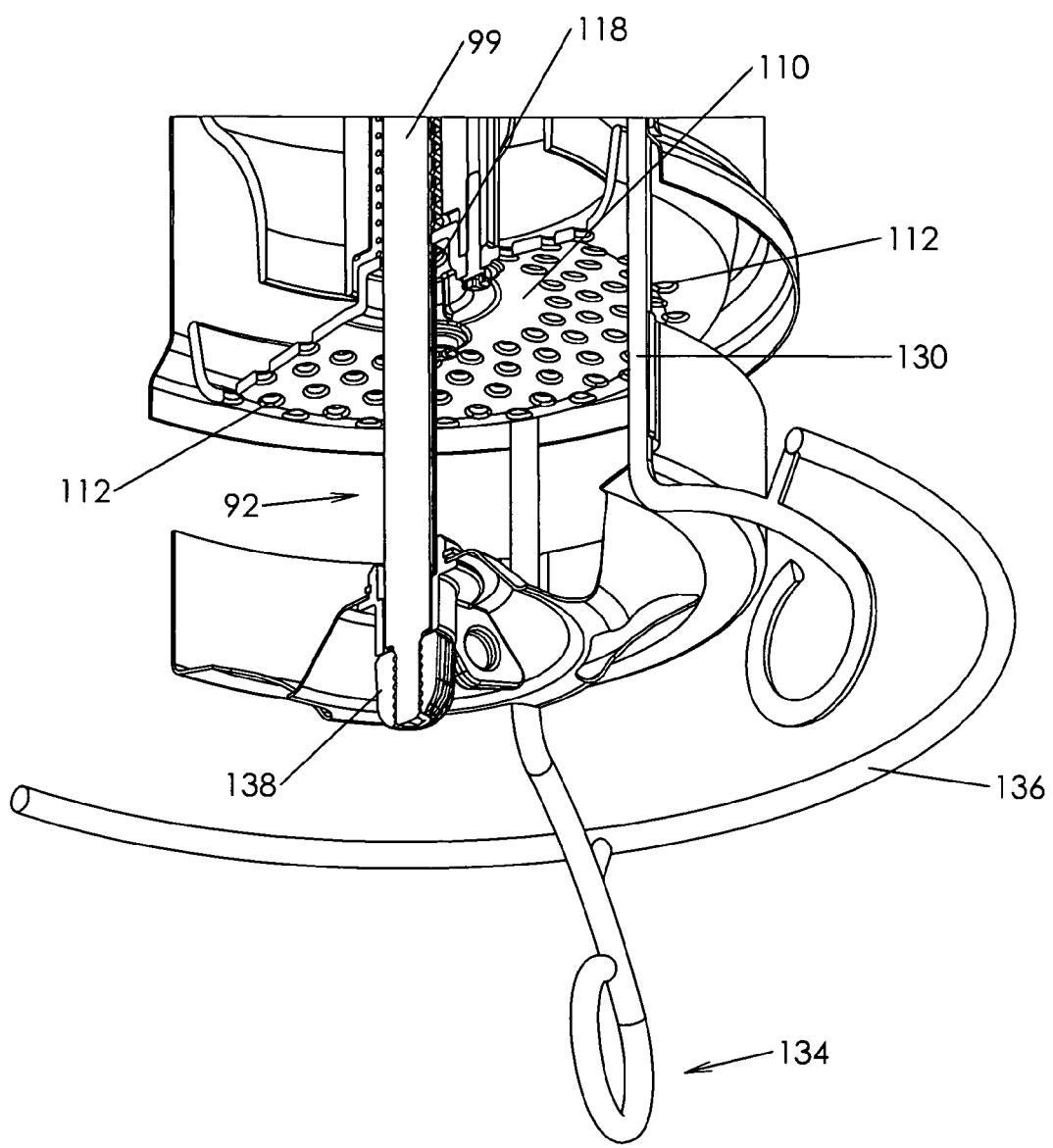
FIG. 8 is a perspective cut away view of the lower portion of the bird feeder.
Figure 9:
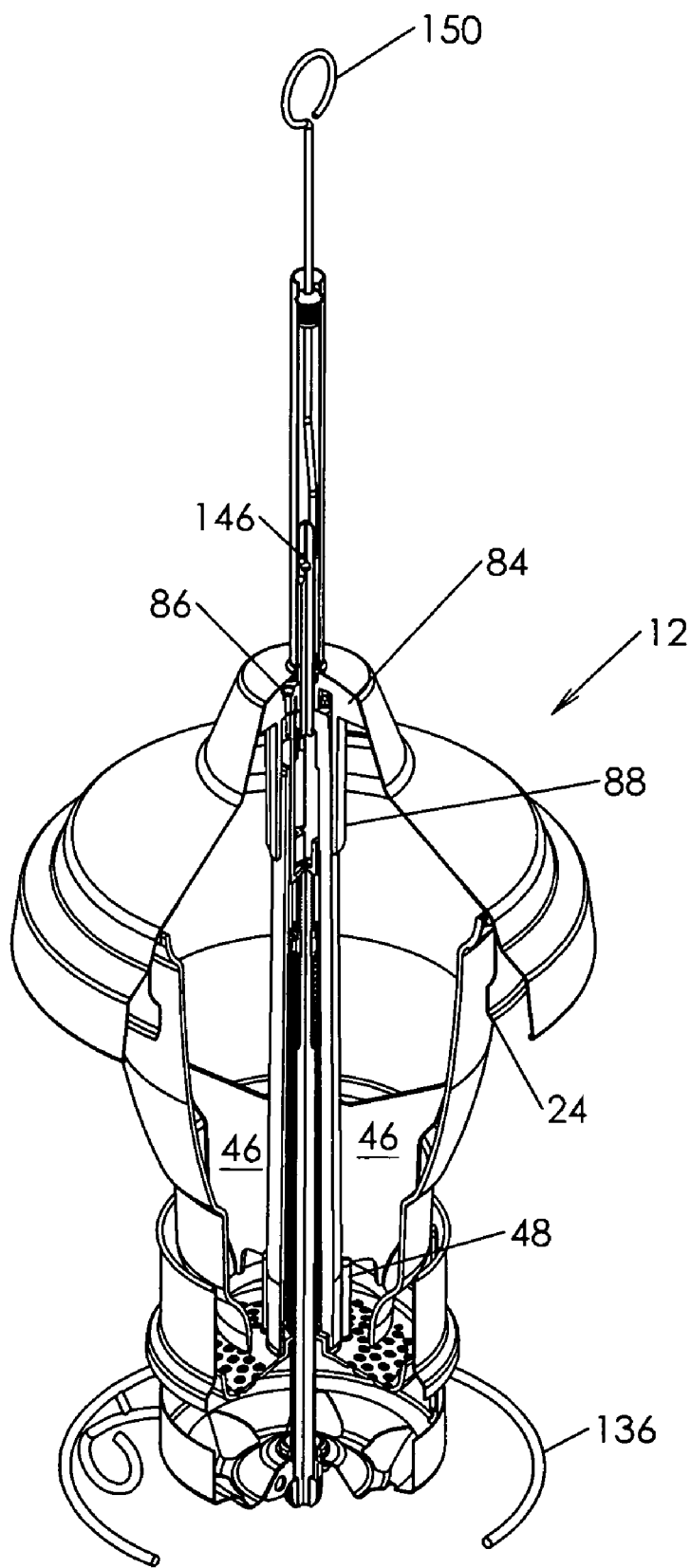
FIG. 9 is a cut away perspective view of the bird feeder.
Figure 10:
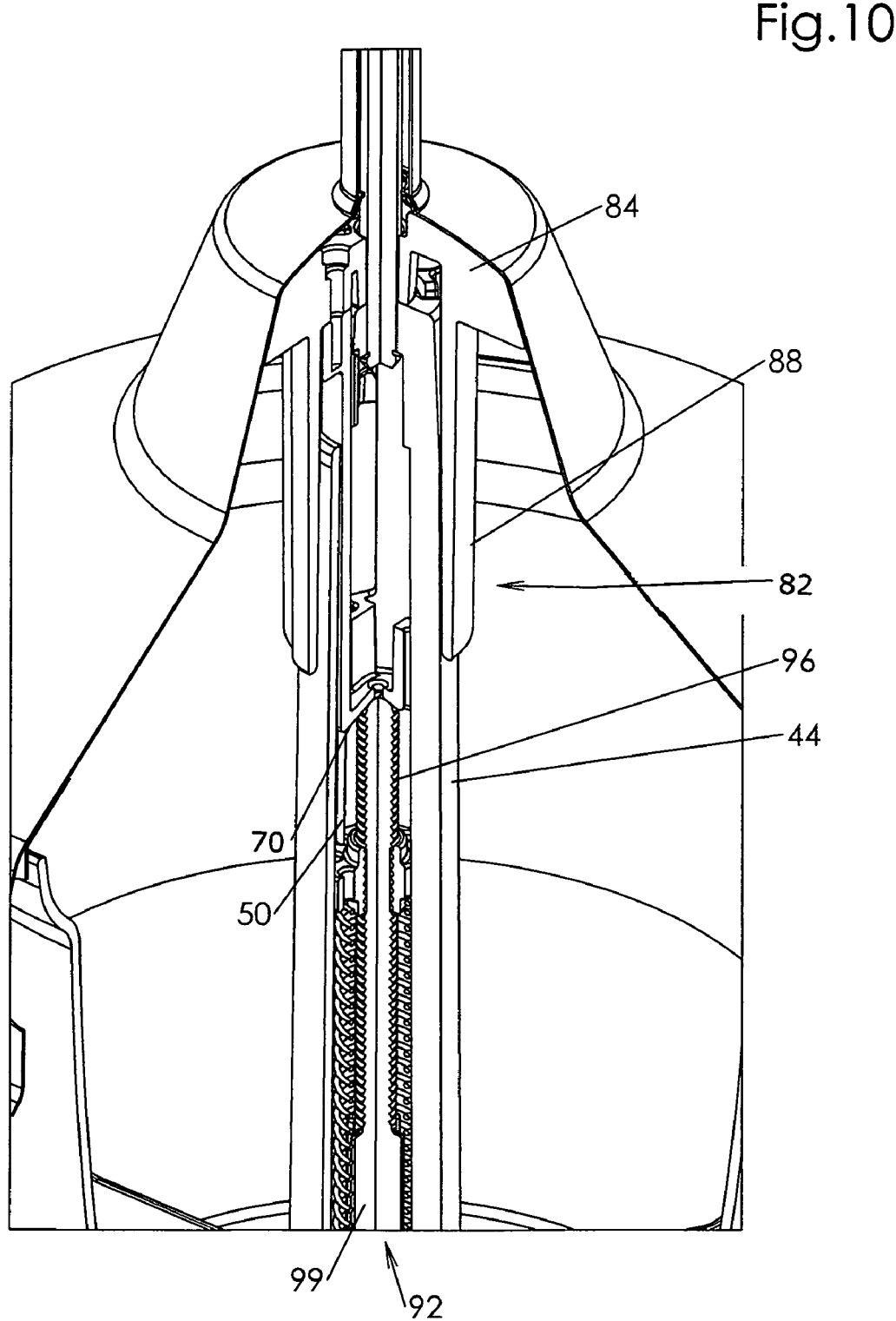
FIG. 10 is a cut away view of the upper portion of the bird feeder.
Figure 11:
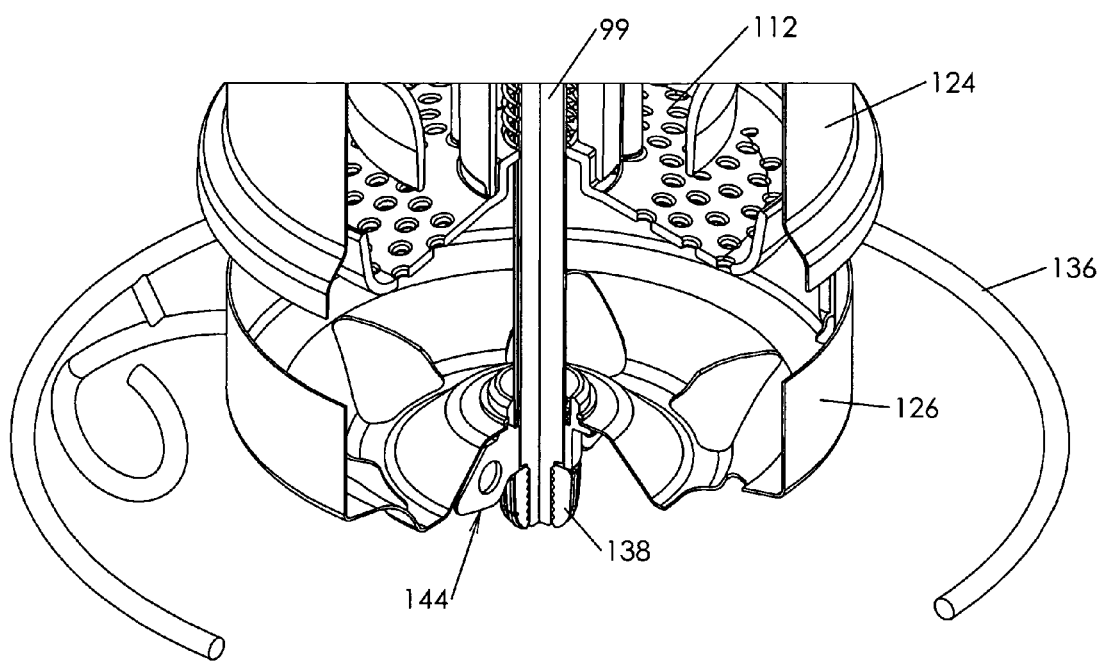
FIG. 11 is a cut away view of the lower portion of the bird feeder.
Figure 12:
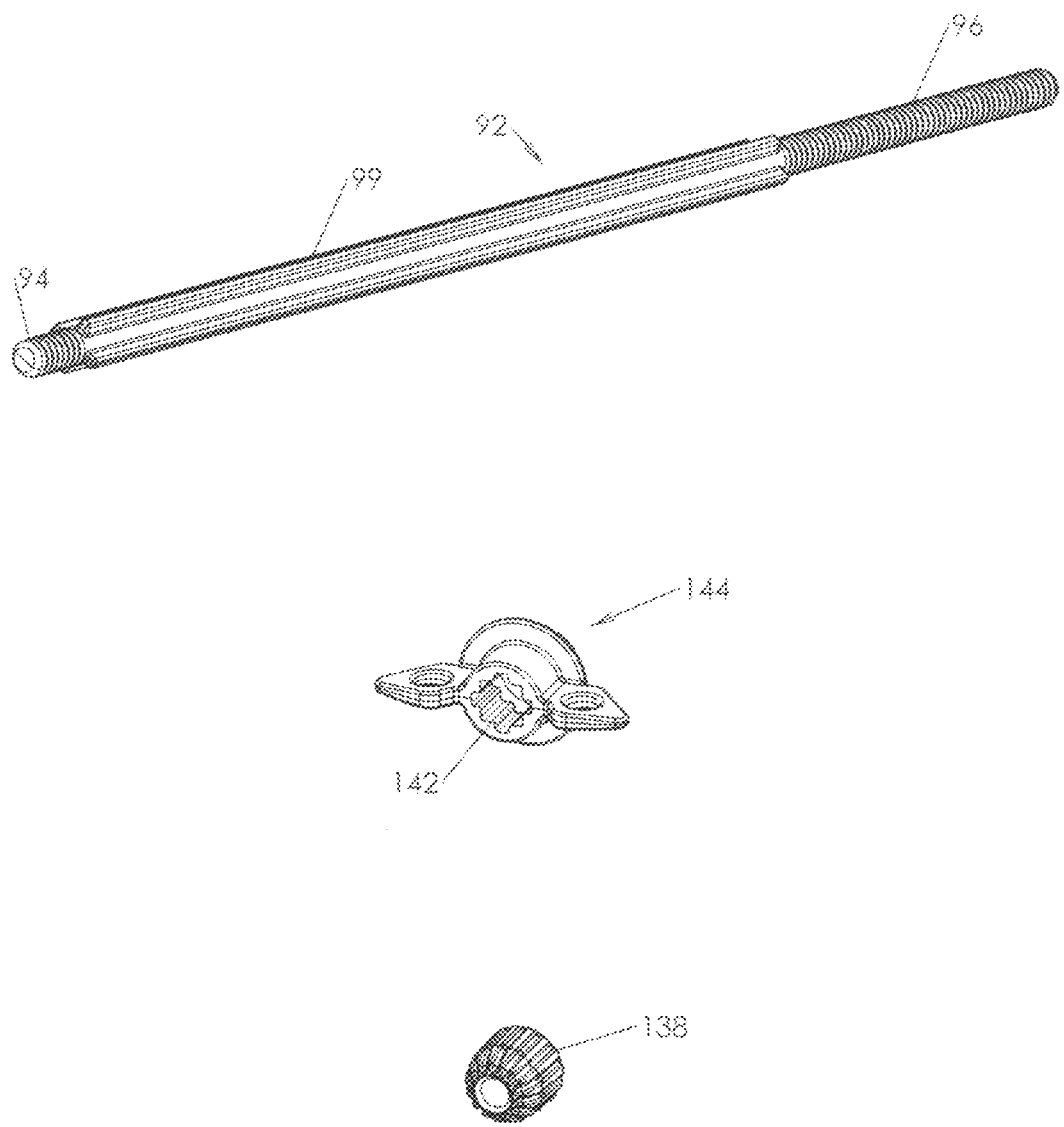
FIG. 12 is an exploded view illustrating the center post and associated components.
Figure 13:
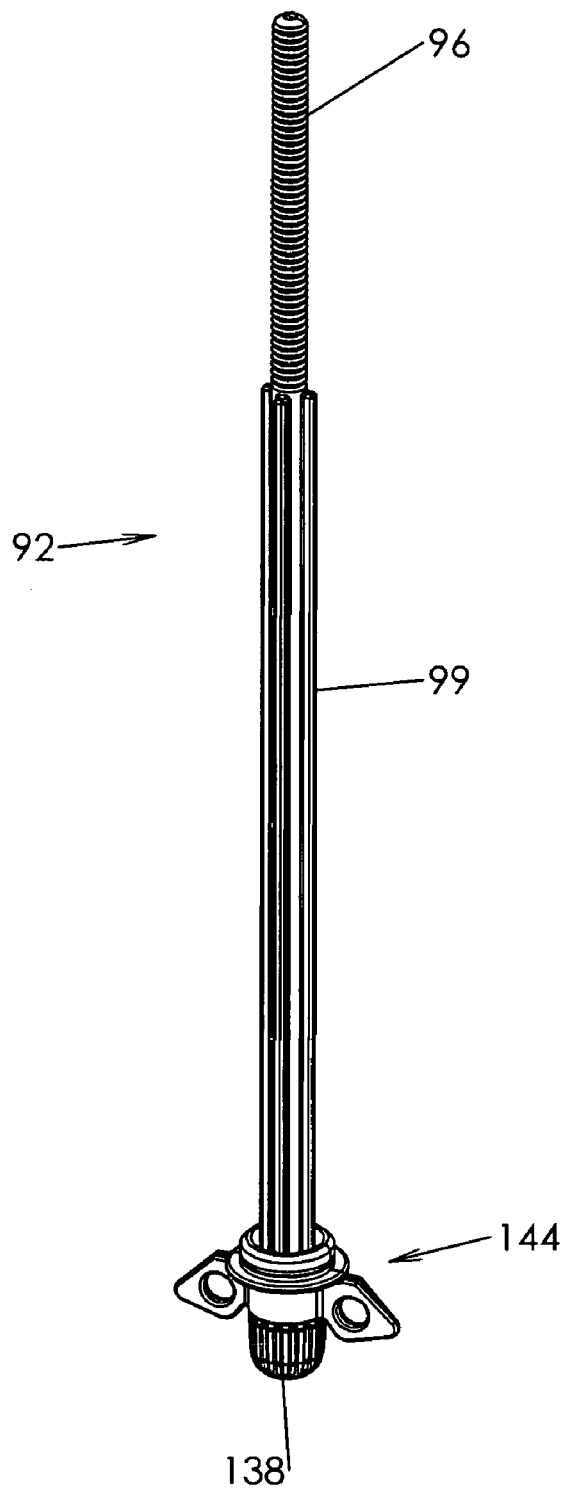
FIG. 13 is a perspective view of the center post and associated components in assembled condition.
Figure 14:
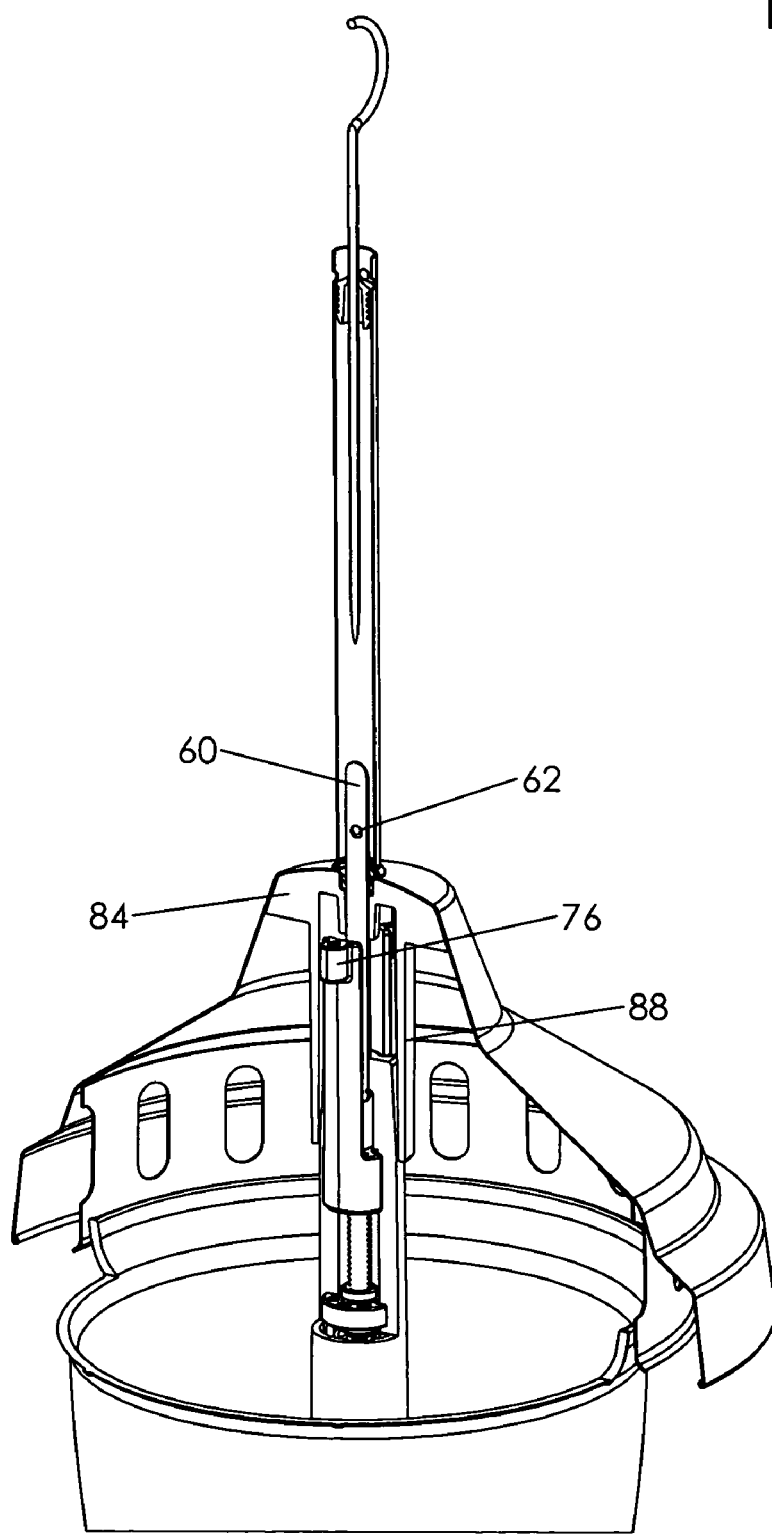
FIG. 14 is a perspective view, in partial cutaway, of the upper portion of the bird feeder.
Figure 15:
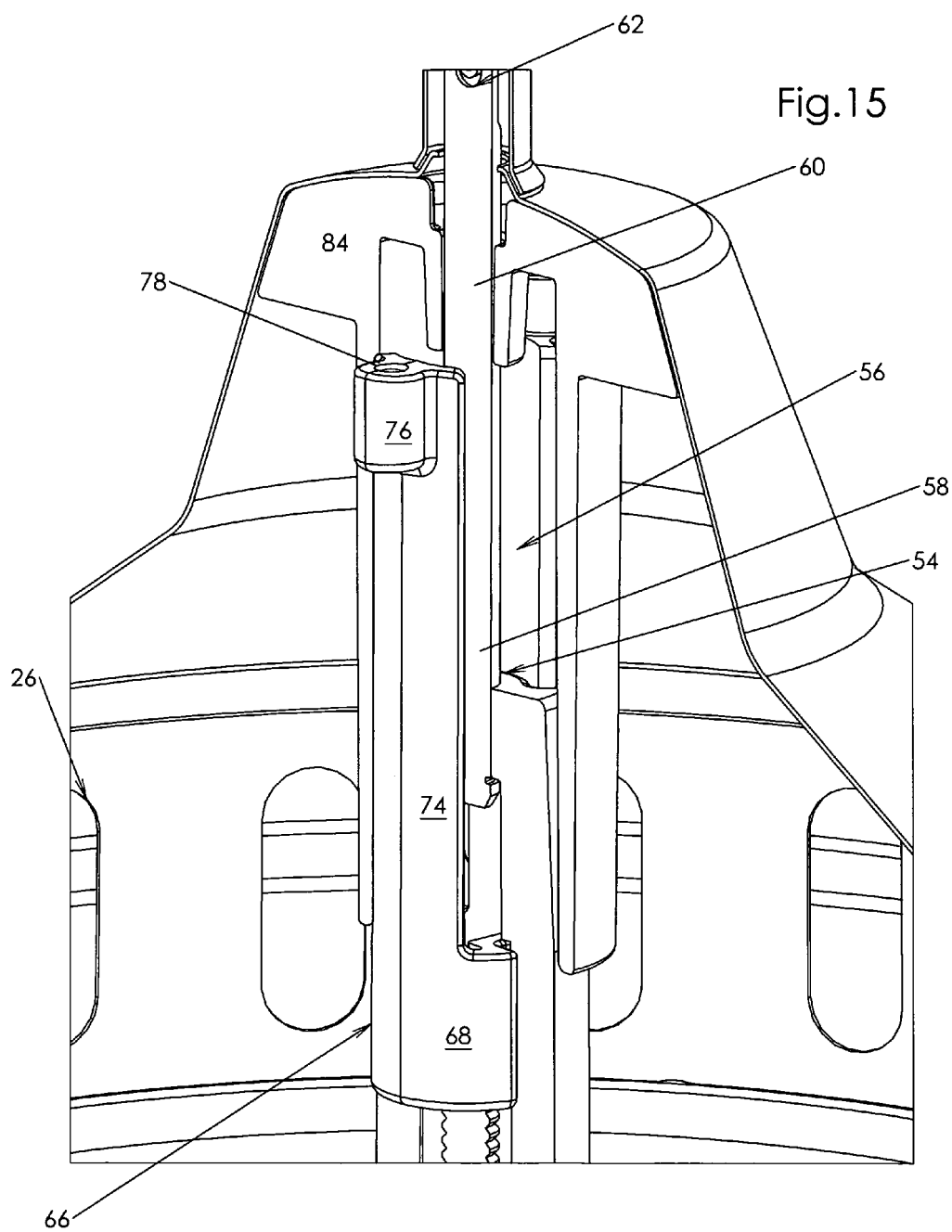
FIG. 15 is a further perspective view, in partial cutaway, of the upper portion of the bird feeder.
Figure 16:
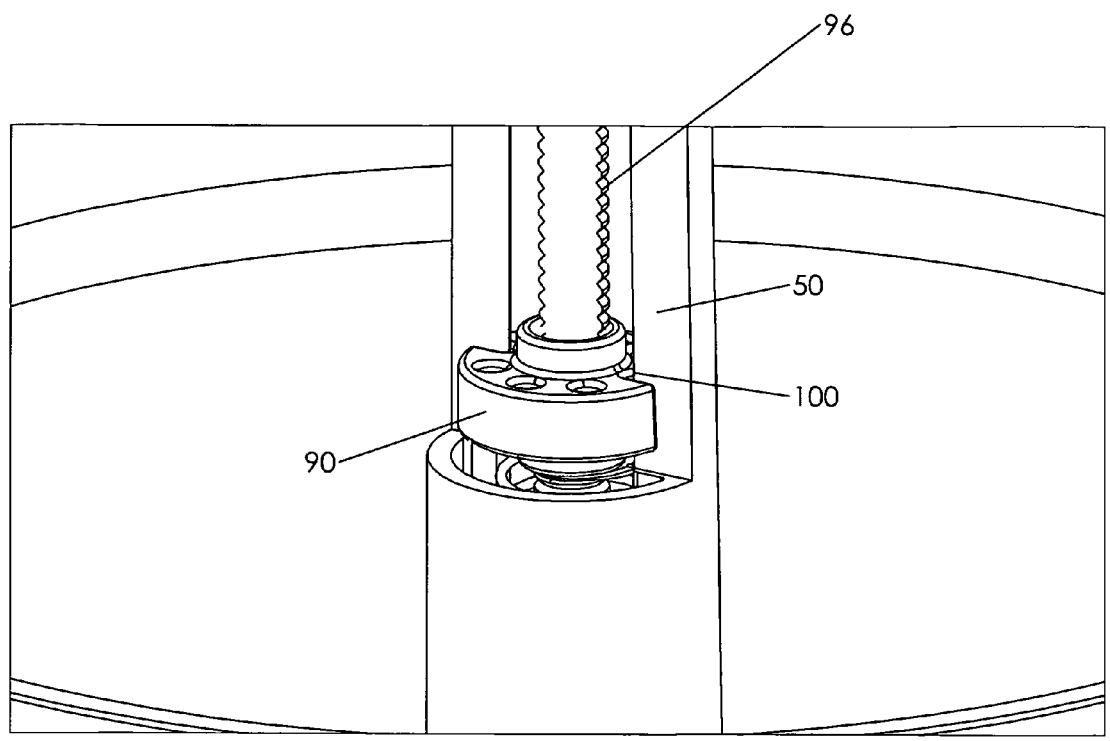
FIG. 16 is a perspective view of the adjustment mechanism for adjusting spring tension.

Referring to the drawings in greater detail and by reference characters thereto, there is illustrated in FIG. 1 a bird feeder of the squirrel resistant type and which is generally designated by reference numeral 10.

Bird feeder 10 includes a cover generally designated by reference numeral 12 in which cover 12 has a top wall 14, an outwardly tapering upper side wall 16 which merges with a first tapered wall section 18 in turn merges with a smaller second tapered wall section 20. At its lower end, cover 10 terminates in a lower side wall 22.

Interiorly of cover 12, there is provided an inner vertical wall 24 which has a plurality of vents 26 formed therein for allowing the egress of any heated gases from the bird feeder. An aperture 28 is provided in top wall 14 to permit the passage of a hanger.

Bird feeder 10 also includes a seed container generally designated by reference numeral 32. Seed container 32 has a first lower wall section 34 which arcuately merges with a second lower wall section 36. The larger portion of the seed container 32 is defined by an upper wall section 38 which terminates in a top wall section 40 which has external ribs 42 thereon. Top wall section 40 is normally spaced from cover 12.

Seed container 32 also includes an integral inner tube 44 which has connecting ribs 46 extending between inner tube 44 and wall sections 34, 36, and 38. At its lower extremity, inner tube 44 has a plurality of threaded cylinders 48 designed to receive screw members as will be discussed in greater detail hereinbelow.

Internally of inner tube 44 there are provided a pair of inner guide ribs 50. At its upper extremity, inner tube 44 has a pair of slots 52 while on its top wall, an aperture 54 is provided to receive a rod 56. Rod 56 has a lower cylindrical portion 58 which is engaged within aperture 54 and a flat portion 60 having an aperture 62.

A plunger assembly has an inner plunger 66 which in turn has a lower body portion 68 having a concave downwardly facing surface 70. A pair of elongated walls 74 extend upwardly with cylindrical portions 76 being provided at the extremity thereof. Cylindrical portions 76 have threaded apertures 78 formed therein; cylindrical portions 76 extend through slots 52.

Also forming a portion of the plunger assembly is outer plunger 82 which has a top portion 84 with apertures 86 formed therein designed to receive screws as will be discussed in greater detail hereinbelow. Outer plunger 82 also has a lower cylindrical portion 88 which is sized to fit about upper end of inner tube 44.

Bird feeder 10 also includes an inner post generally designated by reference numeral 92 and which includes an lower threaded end 94 and an upper threaded end 96. The main body portion includes a ribbed section 99. Engaging with upper threaded end 96 is a threaded nut 90 which has a pair of slots 100 formed on opposite outer side walls thereof. Slots 100 are designed to engage with inner guide ribs 50 to prevent rotation of nut 98.

Mounted about inner rod 92 is an upper spring 104 and a lower spring 106. Springs 104 and 106 are coil springs and in one embodiment, the two springs have a different setting—i.e. they have different spring forces.

Bird feeder 10 also includes a seed tray 108 which has bottom wall 110 which has a plurality of drainage apertures 112 formed therein. Preferably, the upwardly facing side of bottom wall 110 is somewhat convex in configuration. Apart from apertures 112, there are also a plurality of screw receiving apertures 114 formed therein. Seed tray 108 also has a side wall 116 while a central aperture 118 is provided therein to permit the passage of inner rod 92 therethrough.

Bird feeder 10 also includes a shroud generally designated by reference numeral 122 and which shroud 122 includes an upper section 124 and a lower section 126 with an opening 128 therebetween. A plurality of connecting members 130 connect upper section 124 and lower section 126. As aforementioned, an upper portion 132 of rods 130 connect the two sections of the shroud while the remaining lower leg portion 134 forms legs for placing bird feeder 10 on a horizontal surface. A perch 136 in the form of a ring extends around the lower leg portions 138 which provides a roosting place for birds to feed from seed tray 108 through opening 128.

Surrounding the lower portion of inner rod 92 is a wing nut arrangement 144 which has an internal cruciform configuration 142 to receive the ribbed main body 99. The cooperation between ribbed main body 99 and internal cruciform configuration 142 is such as to cause the rotation of inner rod 92 when wing nut 144 is turned. A nut 138 seats on lower threaded end 94 of inner rod 92 to hold shroud 122 in place.

A hanger 144 having a hook 146 at a lower end thereof is designed to engage rod 156. A hanger cover 148 extends about the upper portion of a component 56 while a grasping end 150 is provided at the upper end of hanger 144.

In assembly and operation, inner plunger 66 is placed within inner tube 44 with slots (not shown) formed in the side walls of lower body portion 68 being engaged by inner guide ribs 50. In this respect, preferably inner tube 44 is of a slightly tapered configuration having a greater internal diameter at its lower end compared to its internal diameter at its upper end. Elongated walls 74 of inner plungers 66 have, as previously mentioned, cylindrical portions 76 which will extend outwardly through slots 52. Thus the travel stops of inner plunger 66 are provided by lower body portion 68 engaging an upper wall of inner tube 44 and cylindrical portions 76 engaging the wall defining slots 52.

Outer plunger 82 is attached by means of screws 152 extending through top portion 84 to cylindrical portions 58 of inner plunger 66.

Inner rod 92 is inserted within inner tube 44 with upper threaded end 96 engaging concave surface 70 of inner plunger 66. Engaged with upper threaded end 96 is nut 98 with slots 100 engaging inner guide ribs 50. Upper spring 104 extends about the upper portion of inner rod 92 and abuts concave surface 70 of lower body 68 of inner plunger 66. Lower spring 106 is designed to abut seed tray 108 which is secured to the lower portion of inner tube 44 by means of screws 152 engaging threaded cylinders 48.

It will be understood described embodiment is for purposes of illustration only and that changes and modifications may be made thereto without departing from the spirit and scope of the invention.

I claim:

1. A bird feeder comprising:
   a seed container;
   a seed tray situated below said seed container and connected thereto;
   a shroud extending about said seed tray, said shroud having an opening therein to permit access to said seed tray, said shroud having a bottom portion;
   a perch proximate said opening in said shroud;
   a center tube mounted internally of said seed container;
   a non rotatable nut mounted within said center tube proximate an upper end thereof;
   a rotatable post within said center tube, an upper end of said rotatable post being screwthreadedly engaged with said non rotatable nut, a lower end of said rotatable post extending through said bottom portion of said shroud, stop means on said rotatable post to retain said shroud;
   a spring within said center tube, said spring extending between said non rotatable nut and said seed tray;
   a plunger having a portion thereof located within an upper end of said center tube, said plunger contacting an upper end of said post;
   a rod extending upwardly from a top end of said center tube; and
   a cover about an upper end of said feed container, said cover resting on said plunger.

2. The bird feeder of claim 1 further including an aperture in said rod, a hanger having a proximal end and a distal end, said proximal end having a hook-shaped configuration.

3. The bird feeder of claim 1 wherein said cover has an inner vertical wall, said inner vertical wall having vents formed therein, said cover being spaced from the top of said seed container.

4. The bird feeder of claim 1 wherein said spring within said center tube is comprised of first and second spring portions, said first and second spring portions having different spring forces.

5. The bird feeder of claim 1 wherein said shroud has a upper portion and lower portion, said upper portion and said lower portion being connected by a plurality of connecting members.

6. The bird feeder of claim 5 wherein each of said connecting members extends downwardly to form a leg to support said bird feeder on a horizontal surface.

7. The bird feeder of claim 5 wherein said perch is a ring extending about said seed tray, said perch being connected to said connecting members.

8. The bird feeder of claim 1 wherein said seed tray has a bottom wall and a side wall, said bottom wall having a plurality of drainage apertures formed therein, said bottom wall having an upper surface of a convex configuration, an opening in said seed tray for passage of said rotatable post.

9. The bird feeder of claim 1 further including an adjustment member, said adjustment member being secured to a lower portion of said post such that rotation of said adjustment member causes said post to rotate to thereby adjust the spring force.

10. The bird feeder of claim 9 wherein said adjustment member has a wing nut configuration.

11. The bird feeder of claim 1 wherein said center tube has a transparent portion indicia being located on said transparent portion such that visual access is provided to indicate a position of said non-rotatable nut.

12. The bird feeder of claim 1 wherein said plunger has an inner portion and an outer portion, said inner portion having a body section to abut a top end of said post within said center tube, an outer portion being connected to said inner portion, said outer portion having a wall surrounding a top of said center tube to thereby prevent seeds from entering said center tube.

13. The bird feeder of claim 1 wherein a bottom wall of said shroud has a plurality of openings therein to permit stray seeds to pass therethrough.

14. The bird feeder of claim 1 wherein said center tube has a least one rib formed on an inner wall thereof, said non rotating nut having a slot within a side wall thereof, said rib engaging said slot to thereby prevent rotation of said nut.

15. The bird feeder of claim 1 wherein said stop means comprises a nut screwthreadedly engageable with said rotatable post.

* * * * *